(12) United States Patent
Kennedy

(10) Patent No.: US 7,104,871 B1
(45) Date of Patent: Sep. 12, 2006

(54) METHOD AND APPARATUS FOR RECONDITIONING COMPACT DISCS

(76) Inventor: Michael S. Kennedy, 7942 W. Bell Rd., Suite C-5, #619, Glendale, AZ (US) 85308-8705

( * ) Notice: Subject to any disclaimer, the term of this patent is extended or adjusted under 35 U.S.C. 154(b) by 121 days.

(21) Appl. No.: 10/890,591

(22) Filed: Jul. 13, 2004

Related U.S. Application Data

(60) Continuation-in-part of application No. 09/990,152, filed on Nov. 21, 2001, now Pat. No. 6,780,090, which is a division of application No. 09/449,153, filed on Nov. 24, 1999, now Pat. No. 6,322,430, which is a continuation-in-part of application No. 08/879,711, filed on Jun. 20, 1997, now abandoned.

(51) Int. Cl.
*B24B 1/00* (2006.01)
*B24B 29/00* (2006.01)

(52) U.S. Cl. .............. 451/41; 451/59; 451/63; 451/287; 451/290

(58) Field of Classification Search ........ 451/36, 451/41, 59, 63, 285, 287, 290, 385, 397, 451/398, 451, 456, 488, 446, 538, 57
See application file for complete search history.

(56) References Cited

U.S. PATENT DOCUMENTS

| | | | |
|---|---|---|---|
| 4,179,852 A | 12/1979 | Barnett | |
| 4,481,741 A * | 11/1984 | Bouladon et al. | ............ 451/285 |
| 5,099,618 A | 3/1992 | Schmid | |
| 5,102,099 A | 4/1992 | Brown et al. | |
| 5,167,096 A | 12/1992 | Eltoukhy et al. | |
| 5,207,759 A | 5/1993 | Mehmandoust et al. | |
| 5,220,754 A | 6/1993 | Tayebi et al. | |
| 5,571,041 A | 11/1996 | Leikam | |
| 5,733,179 A | 3/1998 | Bauer | |
| 5,895,270 A | 4/1999 | Hempel, Jr. | |
| 5,954,566 A * | 9/1999 | Bauer | .......................... 451/41 |
| 6,386,946 B1 * | 5/2002 | Lin et al. | ....................... 451/7 |
| 6,431,967 B1 | 8/2002 | Bauer | |
| 6,547,657 B1 | 4/2003 | Bauer | |
| 6,609,959 B1 * | 8/2003 | Takahashi et al. | ............ 451/65 |
| 6,869,344 B1 * | 3/2005 | Miyahara et al. | ........... 451/287 |
| 2002/0084540 A1 | 7/2002 | Bauer | |
| 2002/0086621 A1 | 7/2002 | Bauer | |
| 2002/0168927 A1 | 11/2002 | Bauer | |

* cited by examiner

*Primary Examiner*—Timothy V. Eley
(74) *Attorney, Agent, or Firm*—Gregory J. Nelson

(57) ABSTRACT

An apparatus and method for re-surfacing compact discs. One method is a two-step method in which the disc to be re-surfaced is first placed on a shaft. A resilient pad supports an abrasive medium and is positioned so the abrasive medium overlaps only the protective layer of the CD. The disc and abrasive material are rotated in opposite directions at about the same speed to remove deeper blemishes in a wet operation. Subsequent polishing is accomplished in a similar manner using a polishing compound instead of an abrasive. The re-surfacing and polishing apparatus each have motor driven shafts which are parallel and spaced apart and support the CD and pad in a cabinet. A transparent cover extends across the top of the cabinet. In another embodiment, the resurfacing and polishing is accomplished in a one-step operation in which polishing fluid is applied to a non-abrasive medium is utilized and the fluid is continuously recycled.

8 Claims, 6 Drawing Sheets

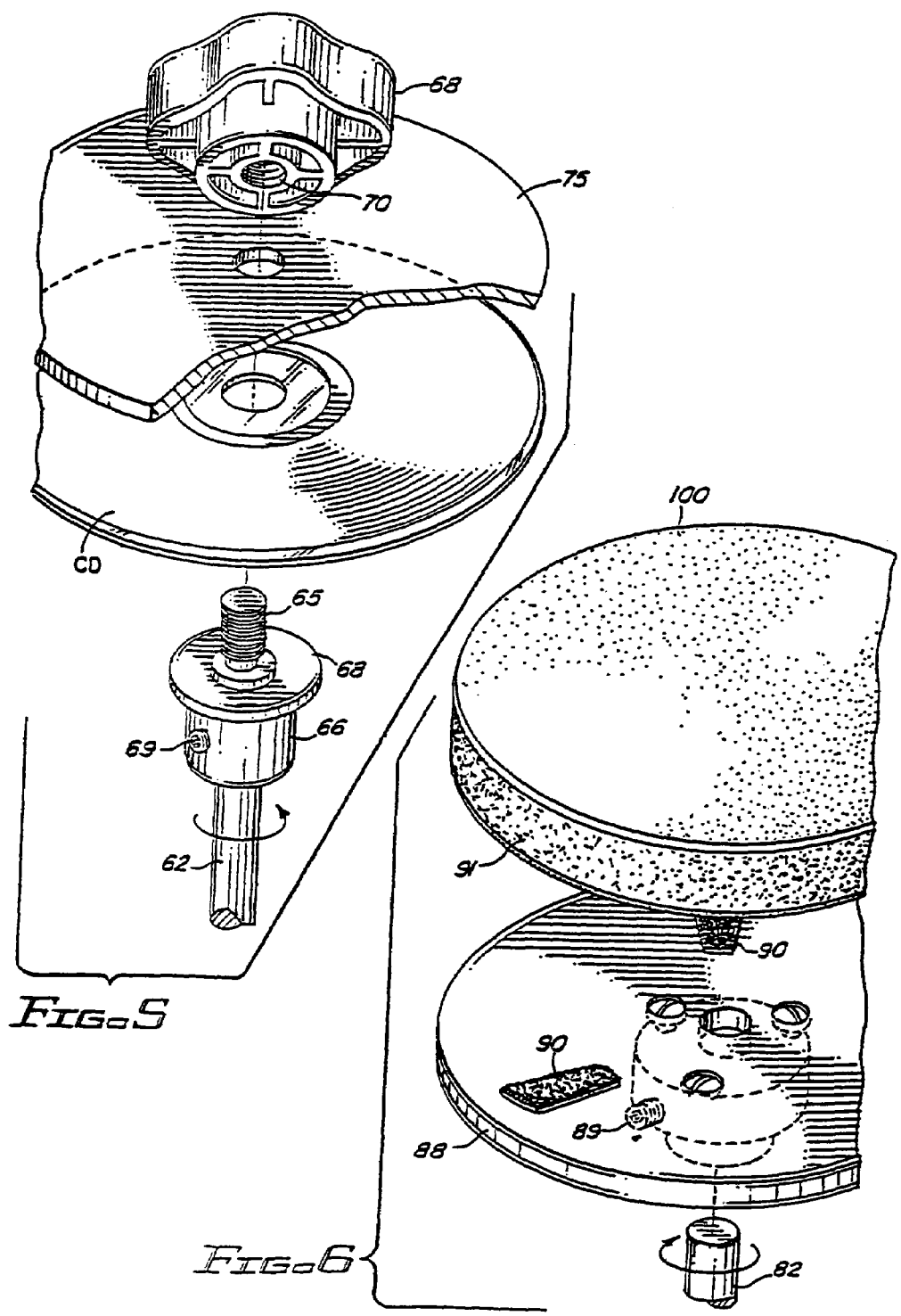

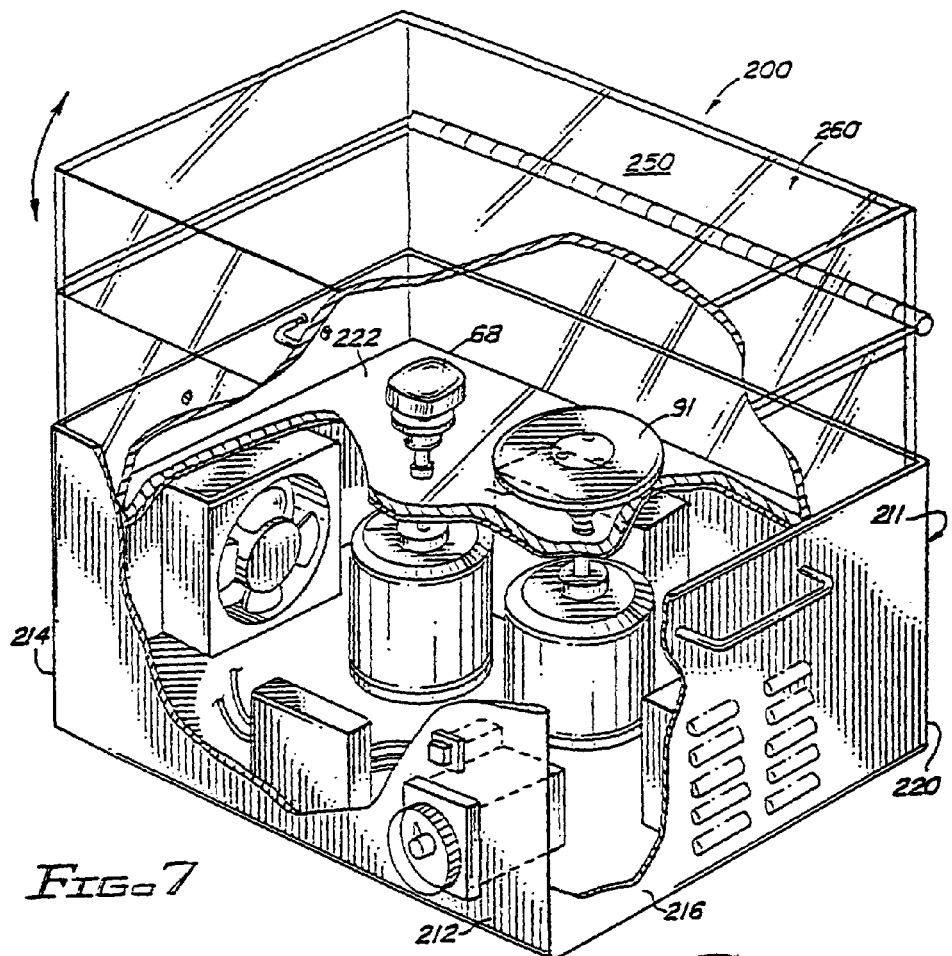
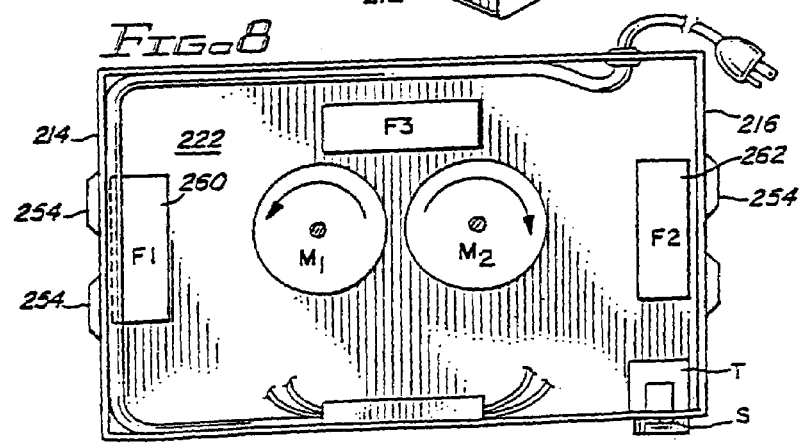

METHOD AND APPARATUS FOR RECONDITIONING COMPACT DISCS

CROSS-REFERENCE TO RELATED APPLICATIONS

This a continuation-in-part of U.S. application Ser. No. 09/990,152, filed Nov. 21, 2001, now U.S. Pat. No. 6,780,090 which is a divisional of U.S. application Ser. No. 09/449,153 filed Nov. 24, 1999, now U.S. Pat. No. 6,322,430 which is a continuation-in-part of U.S. application Ser. No. 08/879,711 filed Jun. 20, 1997, now abandoned all entitled "Method And Apparatus For Reconditioning Compact Discs"

FIELD OF THE INVENTION

The present invention relates to compact discs and more particularly relates to an apparatus and method of reconditioning both audio and compact discs by removing scratches and blemishes in the protective plastic layer on one side of the disc which occur through use and handling of the discs.

BACKGROUND OF THE INVENTION

Compact discs (CD's) are widely used for storing both audio and visual information in digital form. Compact discs are discs which consist of a disc of plastic having a thickness of about 1 mm to 1.5 mm and typically have a diameter of about 4¾ inches. Other types of discs such as digital videodiscs (DVD's) have a smaller digital information band. The information, in digital form, is recorded on an information layer which consists of a continuous spiral data track. After the data is placed on the disc, a metallic film is placed over the data and it is sealed with a protective layer. Damage to the information layer can occur if scratches or other surface blemishes occur in the plastic protective layer. CD's generally have a data track on one side while some discs, such as DVDs, store data on both sides.

Reading of discs is accomplished by a laser beam which scans the disc through the plastic protective layer. The laser is reflected by the metallic film. Damage, as mentioned, to the protective layer will interfere with the scanning process such that tracking errors or distortion will occur when the disc is played.

Even relatively small scratches or blemishes resulting from handling of the disc can lead to disturbances in faulty reproduction. The laser reading beam scans the data track and blemishes, imperfections and scratches in the protective layer which is generally a polycarbonate, will hinder the laser's ability to properly read the data and "skips" will occur.

The prior art discloses various methods and apparatus for refinishing CD's.

U.S. Pat. No. 5,220,754 shows a method for restoring compact discs in which the disc is held and a scraping action is applied to the coating on the disc.

U.S. Pat. No. 5,571,041 discloses a method for repairing and refinishing audio and video CD's. The top side of the disc is placed against a soft, covered wheel and secured to the wheel. The disc is spun on low rpm and a heavy cut cleaner applied across the surface of the bottom side of the disc using a clean cotton cloth or pad. This step is repeated at higher rpm using a medium cut cleaner and then a finer cut cleaner. Clear plastic cleaner and a clear plastic polish are then applied using a cotton pad.

U.S. Pat. No. 5,207,759 discloses a method for texturing a disc using a slurry. The slurry includes different sized particles, preferably a first in the 3 micron size range and a second in the 1 micron size range. Particles are used to abrade the surface of the disc. A pad is moved relative to the disc to scour the substrate.

U.S. Pat. No. 5,167,096 discloses a method and apparatus for texturing a substrate. A texturing pad and the disc are rotated about parallel, offset axis and pressed against one another in the presence of a particle slurry. The inner, less compressible region of the pad produces a deeper grooved texturing on an inner, annular surface of the disc.

U.S. Pat. No. 5,099,618 discloses a method for repairing damaged recording discs by removing a part of the protective layer in directions cutting across the data track path.

U.S. Pat. No. 4,179,852 relates to a method and apparatus for polishing a floppy disc. The floppy disc is placed on a circular, resilient pad disposed on a first spindle-mounted circular platen. A circular, fibrous or abrasive polishing disc is disposed on a second spindle-mounted circular platen. The radius of the polishing disc is greater than the width of an annular region to be polished on the disc so that the relative velocities between points on the polishing disc and the points on the floppy disc are uniform. In the apparatus of this patent, the floppy disc and polishing disc are rotated in the same angular direction at first and second velocities.

SUMMARY OF THE INVENTION

The present invention relates to a method and apparatus for reconditioning compact discs by removing blemishes or scratches in the polycarbonate or plastic protective layer by a multiple step process in which the discs are first resurfaced and then subsequently polished to their original factory condition.

Re-surfacing is first accomplished in an apparatus having a cabinet in which is mounted a pair of motors having spindles or shafts vertically extending in spaced parallel relationship. The spindles or shafts are rotated in opposite directions, one being rotated clockwise and the other being rotated counter-clockwise. The shafts extend upwardly into a re-surfacing chamber in the cabinet. Each of the shafts extend through a fixed protective sleeve. An arbor is secured to the end of one of the shafts and a resilient foam pad is detachably secured to the arbor by an adhesive or a loop and hook fastener material such as that sold under the trademark Velcro®. A circular pad having an abrasive surface is secured to the upper surface of the foam pad with the abrasive surface facing upwardly. The adjacent, oppositely rotating shaft has a protective sleeve about it and has a threaded upper end. A collar and hub are adjustable and secured to the shaft. The disc to be processed is placed on the collar and a locking knob may be tightened about the threaded distal end of the shaft to secure the disc in place for processing. The collar may be axially adjusted on the shaft to insure that the disc and the abrasive surface are parallel and in full light engagement. A plate-like bearing member may be interposed between the locking knob and the disc. When the disc is positioned for re-surfacing, the plastic protective layer on the underside of the disc overlaps the abrasive material on the pad on the adjacent shaft. The diameter of the arbor and associated abrasive disc are selected so that the abrasive disc does not overlap the annular data track or mirror band the center of the disc being processed.

A water reservoir is provided in the cabinet of the re-surfacing machine and water or other fluid is discharged onto the upper surface of the abrasive material in a wet sanding operation. The motors when energized rotate at a predetermined speed and re-surfacing progresses until the deeper scratches are removed. Abrasive materials having different grits, as for example 30 micron, 15 micron, 9 micron and 3 micron particle size grit, may be progressively used to remove scratches by removing a portion of the plastic protective layer. The water and any removed material is collected in a sump in the bottom of the re-surfacing chamber and discharged to a collection area or drain.

Once re-surfacing has occurred, the discs are subjected to a second process which is a polishing process to smooth the protective plastic surface of the disc to its original condition. This is accomplished in an apparatus also having a cabinet containing a pair of spaced-apart motors with vertically extending shafts. The polishing machine is constructed similar to the re-surfacing apparatus described above, having an arbor on one motor shaft which rotates in one direction. A foam pad is detachably securable to the arbor. The compact disc to be processed is mounted on the adjacent shaft at a collar overlapping the foam pad. A locking knob and bearing plate secure the CD in place. The locking knob is in threaded engagement with threads on the upper or distal end of the rotating shaft. Generally, an abrasive material is not utilized in the polishing operation. Instead, a polishing compound, preferably a water-based compound, is applied to the upper surface of a foam polishing pad when the motors are energized, polishing continuing until the protective surface of the compact disc is restored to its original condition.

The re-surfacing and polishing operation may be carried out in a single device incorporating the apparatus described above. Also, multiple work stations may be provided in both the re-surfacing and polishing apparatus.

The apparatus and method can be utilized to restore the surface of a disc in a single or one-step operation utilizing an apparatus as described in which a polishing pad is used and a non-petroleum-based polishing and buffing fluid in the form of slurry is applied to the pad. The fluid is returned to collection sump and recycled. The operation continues until the surface is essentially blemish free and polished and buffed to a like-new condition, normally from one to five minutes.

BRIEF DESCRIPTION OF THE DRAWINGS

The above and other objects and advantages of the present invention will be more apparent from the following description, claims and drawings in which:

FIG. 5 is a detail perspective view showing the end of the motor shaft and the mounting for receiving a compact disc to be polished;

FIG. 6 is a detail perspective view of the end of the motor shaft of the re-surfacing machine which receives the polishing material;

FIG. 7 is a perspective view of the polishing apparatus for performing the polishing operation according to the present invention;

FIG. 8 is a cross-sectional view showing the motor chamber of the polishing machine of FIG. 7;

DETAILED DESCRIPTION OF THE INVENTION

Figure 1:
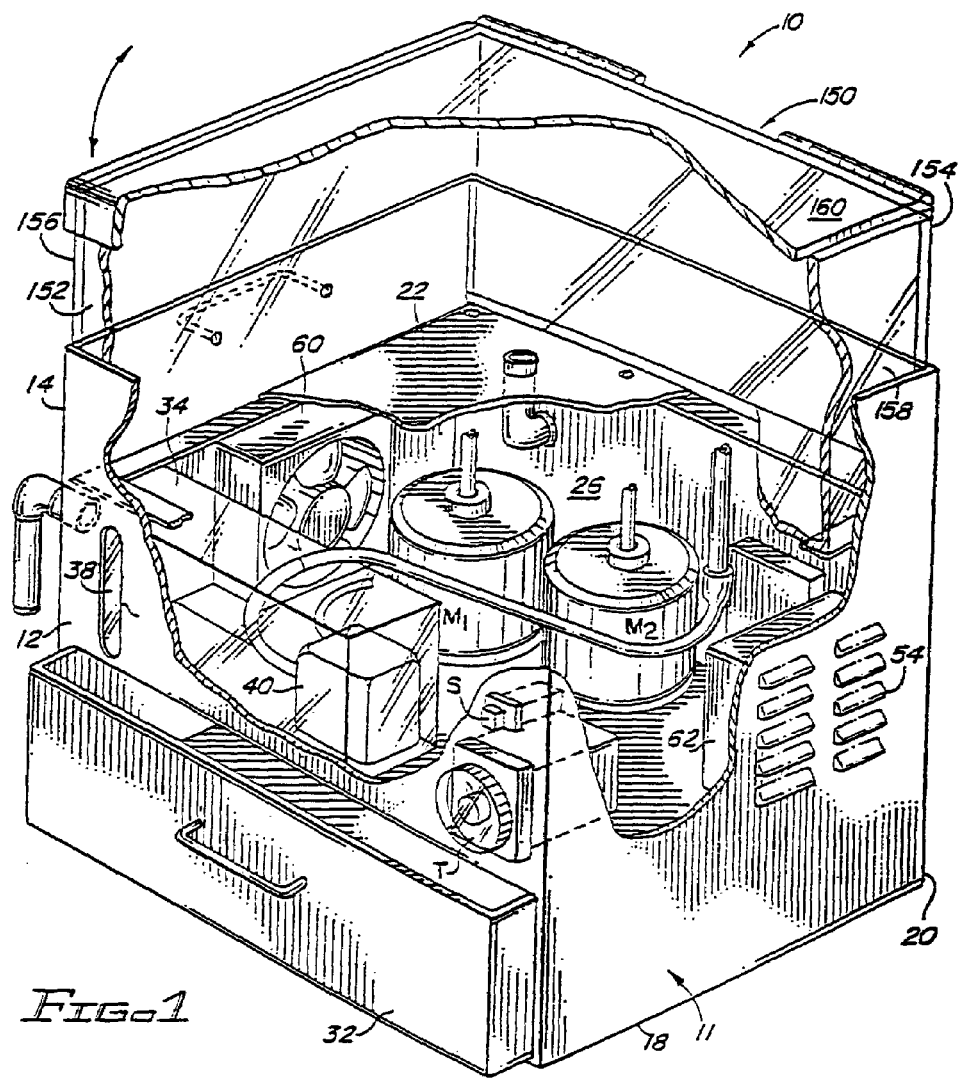
FIG. 1 is a perspective view, partly broken away, of the re-surfacing apparatus according to the present invention.

The present invention provides both an apparatus and method for re-conditioning compact discs and other discs containing digital information such as DVD's and game discs and the terms "disc" or "CD" are used herein to apply to a variety of information bearing discs fo this type including, but not limited to, CD's, DVD's, computer discs and game discs. The method involves first removing the deeper scratches and blemishes in a first re-surfacing apparatus of the type shown in FIGS. 1 to 4. Subsequently, the plastic surface of the discs, from which the deeper blemishes and scratches have been removed, are polished on a polishing apparatus such as shown in FIGS. 7 and 8. The apparatuses shown in FIGS. 1 to 4 and FIGS. 7 and 10 utilize a first rotatable shaft on which the CD to be processed is mounted and a second, spaced-apart parallel shaft which has an arbor on which the polishing pad or abrasive material is mounted. The two shafts are rotated in opposite directions toward one another at approximately the same rotational speed. The compact disc overlaps a portion of the polishing pad or abrasive material on the adjacent shaft. The term "Compact Disc." disc" or "CD" as used herein is intended to encompass various types of digital recording discs such as compact discs, digital video discs, game discs and compact disc recordables and similar discs on which digital information is embedded.

Turning now to FIGS. 1 to 4, the re-surfacing apparatus of the present invention is shown and is generally designated by the numeral 10. The re-surfacing apparatus has a cabinet 11 with a front wall 12, opposite side walls 14 and 16, bottom 18 and a rear wall 20. The cabinet is open at its upper end but has a planar floor 22 which is parallel to the bottom and is spaced downwardly from the upper edge of the cabinet. The floor 22 divides the cabinet into a lower component chamber 26 which receives the motor and other components of the apparatus and an upper re-surfacing chamber 30. An optional drawer 32 may be slidably received within the front wall 12 for storage of materials such as abrasive pads and the like. Handles may be provided for convenience when lifting or moving the apparatus.

The component chamber houses a reservoir 34 which may be any convenient shape but is shown as a generally rectangular structure positioned immediately adjacent the front wall 12. The reservoir 34 is preferably fabricated from a transparent material such as plastic. The front wall 12 defines a vertically extending, elongated aperture 38 which serves as a sight glass so that the level of the liquid in the adjacent reservoir 34 can be visually observed by the operator.

A submersible pump 40 is positioned in the reservoir and has an outlet connected to a flexible tubing section 42 which terminates at a fitting 46 in floor 22. A vertical supply tube 48 is, at its lower end, secured to fitting 46. At the upper end of supply tube 48, a manually controlled valve 50 is positioned which has a flexible outlet or nozzle 52. Reservoir 34 has an inlet 54 which is connected to a suitable source of fluid so that it may be filled to a desired level when it is observed that the level is below a predetermined level, such as the fill level "F" as indicated in FIG. 1.

Opposite end walls 14 and 16 are provided with a series of vents or louvers 54. A first fan 60 is located against end wall 14 and draws air from the exterior of the cabinet and discharges it into the component chamber. A second fan 61 is located against the interior side of end wall 16 and draws air from within the component chamber and discharges it through the louvers 54 in end wall 16. The fans operate to keep the components within the component chamber cool.

Figure 4:
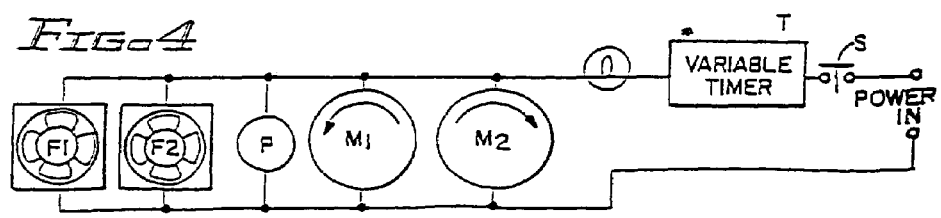
FIG. 4 is a schematic of the electrical system of the re-surfacing apparatus of FIG. 1.

Polishing is accomplished by means of motors M1 and M2 which are electric motors preferably fractional horse power motors operable between approximately 700 rpm and 1,750 rpm. The motors may be either fixed or variable speed. The motors rotate in opposite directions toward one another and M1 is shown as operating in a counter-clockwise direction and M2 operating in a clockwise direction. The motors, fans and pump are in a circuit as shown in FIG. 4 and are energized by power switch "S" and timer "T". Motor M1 has an output shaft 62 which extends upwardly into the re-surfacing chamber 30. The shaft 62 is housed within a fixed sleeve 64 which extends upwardly from floor 22. The upper or distal end of shaft 62 is threaded at 65 as best seen in FIG. 5. A hub 66 is slidable along the shaft and has an annular collar 68 at its upper edge. A set screw 69 is provided so that the collar and hub may be positioned at any selected axial position along the shaft 62. A locking knob 68 has an internally threaded portion 70 which is selectively engageable with threads 65.

As seen in FIG. 5, it will be seen that a CD to be processed may be positioned over the end of the shaft 65 with the center opening in the CD aligned with the end of the shaft. The CD will rest on the collar 68 of the hub. A bearing plate 75 is preferably interposed between the locking knob and the upper surface of the CD to apply uniform pressure over the surface of the CD. When the re-surfacing operations are carried out, the CD is positioned with the label area disposed upwardly and the plastic protective layer which is to be re-conditioned, disposed downwardly.

Figure 2:
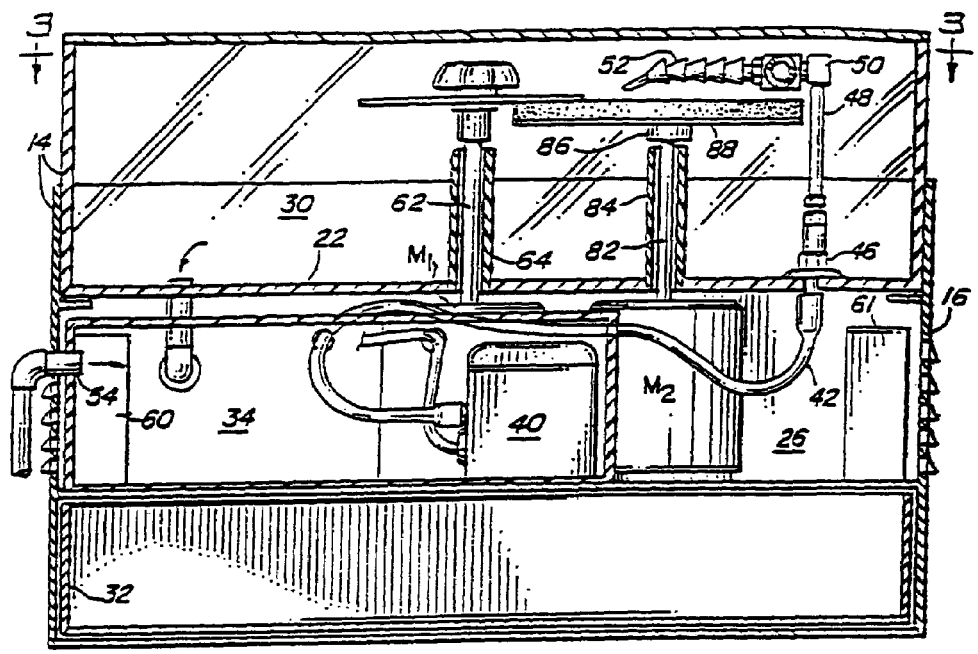
FIG. 2 is a cross-sectional view of the re-surfacing machine shown in FIG. 1.

Motor M2 is provided with vertically extending shaft 82 which is in spaced parallel relationship with shaft 62. Shaft 82 also extends through a fixed sleeve 84 which projects from the upper surface of floor 22. The upper end of shaft 84 carries an arbor 88 which is mounted on a hub 86 as seen in FIGS. 2 and 6. Hub 86 is securable to shaft 82 by means of set screw 89. The diameter of the arbor and abrasive are selected having diameters corresponding to the radial width of the data track on the disc to be processed. If a disc, DVD, is to be processed, the arbor 88 may be replaced with an arbor selected having a diameter that does not overlap into the center or mirror band of the disc. This band may contain information which if scratched may prevent the disc from loading or may remove the title. For example DVD and Sega Dream Cast® have information bands that have a width different than compact discs.

The upper surface of arbor 88 may be provided with areas of a suitable fastener material 90 such as one component of a loop and hook fastener or adhesive patches. The diameter of the arbor is selected so that the arbor will overlap the CD being processed to approximately the label area of the CD when the CD is positioned on collar 68. The arbor supports the re-surfacing or polishing components. It will be noted that FIGS. 5 and 6 are representative of the shaft mounting for both the re-surfacing apparatus described in FIG. 1 and the polishing apparatus shown in FIG. 7 and described hereafter. The principal difference is that the re-surfacing operation utilizes a resilient pad 91 which is detachably secured to the upper surface of the arbor 88 and held in place by the strips of fastening material 90. The foam pad is a resilient expanded foam and provides a smooth re-surfacing and polishing operation. The pad also is used without an abrasive in the subsequent polishing operation. A suitable pad is one sold by Crain Industries of Phoenix, Ariz. In the re-surfacing operation, an abrasive disc 100 is placed on the upper surface of the foam pad 91. The pad 91 provides resilience so that excessive material removal does not occur from the bottom surface of the CD. Preferably, in the re-surfacing operation, various grits of abrasive material are used generally starting with 30 micron and decreasing to 3 micron in selected, progressive steps. In the polishing operation, polishing is accomplished by using upper surface of the foam pad 91 without an adhesive material and in place of the adhesive material a polishing compound is applied to the pad.

The re-surfacing apparatus shown in FIG. 1 further includes a protective cover 150. The protective cover is preferably fabricated from a transparent material and has front wall 152, rear wall 154 and opposite end walls 156, 158. The walls form a rectangular box-like structure which is slidably received within the open upper end of the cabinet. The lower end of the walls of the cover rests on the floor 22. Thus, the entire protective covering can be removed for cleaning when necessary. A lid 160 is hinged to the rear wall 154 and extends across the top of the transparent cover. The lid can be opened to provide access to the re-surfacing chamber.

Referring now to FIGS. 7 to 8, the polishing apparatus is shown. As mentioned above, the polishing apparatus is similar to the re-surface apparatus and utilizes motors M1 and M2 as described with reference to the re-surfacing apparatus of FIG. 1. Further, the mounting for the CD at the upper end of motor M1 of the polishing apparatus is essentially the same as that has been described with reference to FIG. 5. Motor M2 supports a vertically extending shaft which supports an arbor 88 to which a polishing pad 91 can be detachably secured.

The polishing apparatus of FIGS. 7 and 8 is generally designated by the numeral 200 and has a cabinet 211 with front wall 212, opposite end walls 214, 216 and rear wall 220. The upper end of the cabinet is open and the floor 222 extends horizontally at an elevation below the upper edges of the cabinet. The floor 222 divides the cabinet into a lower component chamber and an upper polishing chamber. Motors M1 and M2 are contained in the lower component chamber along with fans 260 and 261 located on the interior of end walls 214 and 216, respectively. Louvers 254 are provided in the opposite end walls so that a flow of cooling air is induced through the lower component chamber. A suitable timer "T" may be set to a desired time. The schematic in FIG. 4 is representative of the circuitry of the electrical components of both FIGS. 1 and 7.

The polishing apparatus 200 is provided with a protective cover 260 which is, again, shown as being transparent having front, rear and opposite side walls defining a generally rectangular structure. A lid 250 is hinged to the rear wall so that access to the polishing chamber is accommodated. Further, the protective cover 260 rests on the floor 222 so that the entire cover may be removed for cleaning or servicing as necessary.

Figure 3:
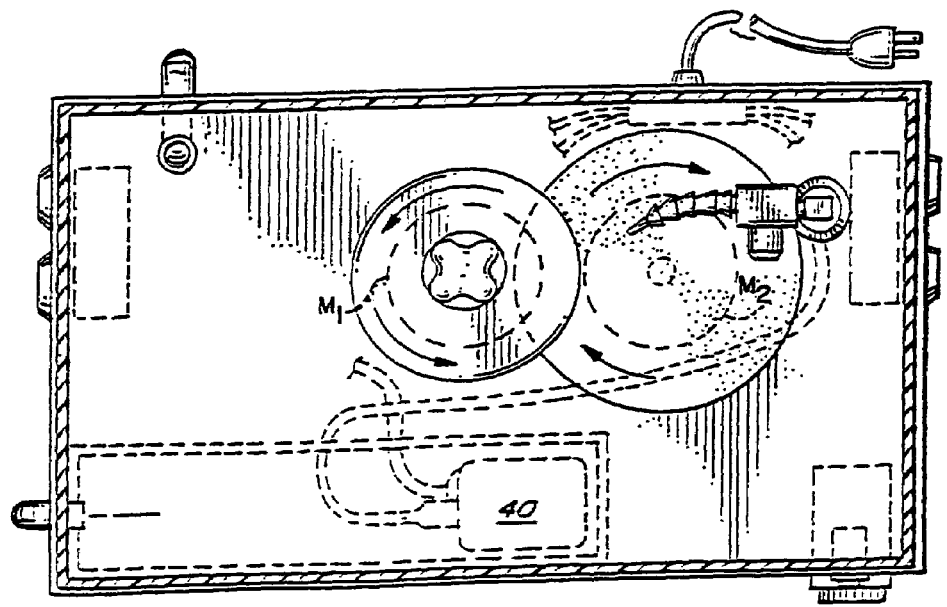
FIG. 3 is a sectional view taken along line 3—3 of FIG. 2.

In use, the CD to be processed is first subjected to re-surfacing in the apparatus shown in FIGS. 1 to 5. As seen in FIG. 5, the CD is mounted on the shaft of section M1 with the label area disposed upwardly and the protective plastic layer disposed downwardly. The CD is positioned on the collar 68 of hub 66 and the hub positioned at an elevation so that the plastic layer will be in gentle but firm flat-to-flat contact with the abrasive material 100 disposed on the upper surface of the foam pad 91. The diameter of the arbor 88 and the abrasive disc 100 are selected so as to fully re-surface the annular digital information bearing area "A" without damaging the center band "B". Re-surfacing and polishing occurs firm the peripheral edge of the disc to the band "B" although the information band may not extend entirely to the peripheral edge. The flat-to-flat procedure also avoids rounding the edges of the disc. Bearing plate 75 is positioned over the label area of the CD and the knob 68 is tightened in place. The bearing plate is circular, preferably plastic, having an anti-slip coating 76 which maintains the disc firmly in a planar position and resists slippage of the disc during processing. The foam pad is detachably secured to the upper surface of arbor 88 and supports adhesive material 100. The timer "T" is set to the desired time, as for example from one to several minutes, depending upon the severity of the scratches and blemishes on the CD. The motors, pump and fan are energized by the power switch "S" which causes motors M1 and M2 to rotate in opposition directions inwardly toward the polishing area 1 as shown in FIG. 3. Water is delivered to the upper surface of the abrasive medium to provide a wet sanding operation and to keep the disc cool. Re-surfacing continues for a period of time until at least the more severe blemishes and scratches are removed. The operator will then determine whether to continue re-surfacing using abrasives of a finer grit, as for example 15 micron abrasive material. To do this, the abrasive material 100 can simply be peeled off the upper surface of the disc and another adhesive layer placed on the upper surface of the foam pad. Preferably the abrasive material has a backing with a lightly pressure sensitive adhesive which will maintain the abrasive material on the foam pad. During the re-surfacing operation, the transparent covers allow full visual inspection but provides protection to the operator and prevents splattering.

Alternately, the operator may determine to process a number of CD's and in doing so may subject a group of CD's to the initial abrasive re-surfacing operation using more abrasive material. Once a number of CD's have been subjected to re-surfacing using an abrasive material, for example 30 micron abrasive, progressive re-surfacing using finer abrasives can be performed.

Once re-surfacing operation has been completed, the discs are then subjected to final polishing in a polishing apparatus such as that shown in FIGS. 7 and 8. The CD is mounted on the shaft of motor M1 in the manner shown in FIG. 5 and motor M2 supports an arbor and foam polishing pad having a selected diameter to polish the annular information area. If the disc does not gently, firmly and fully contact the polishing pad, the hub and collar 66 can be loosened at set screw 69 and axially adjusted along shaft 62 to achieve proper alignment and contact. The flat surface-to-surface polishing and re-surfacing restores the discs without damage to either the information layer or the center band and avoids rounding of the edges which can irreparably damage a disc. No abrasive is used in the polishing operation. Neither is water necessary. The motors are energized and a suitable polishing compound such as that available from Ultra Tech Manufacturing Co. of Bloomington, Minn. is applied to the upper surface of the foam pad 91. Polishing will restore the surface of the disc to its original factory condition. When polishing is completed, the disc is removed by loosening knob 68 and the CD can be subjected to final cleaning and is ready for use.

While the above apparatus and method has been described with respect to separate re-surfacing and polishing machines, it will be obvious that re-surfacing and polishing machines can be housed within a single cabinet. It will also be apparent to those skilled in the art that re-surfacing and polishing machine as described above may be constructed having a plurality of re-surfacing and polish work stations within a single cabinet. In such a configuration, multiple pairs of motors M1 and M2 would be provided within the single cabinet. Re-surfacing abrasive material suitable for this purpose having various grits, such as those of the type manufactured by PSI Testing Systems, Inc.

Figure 9:
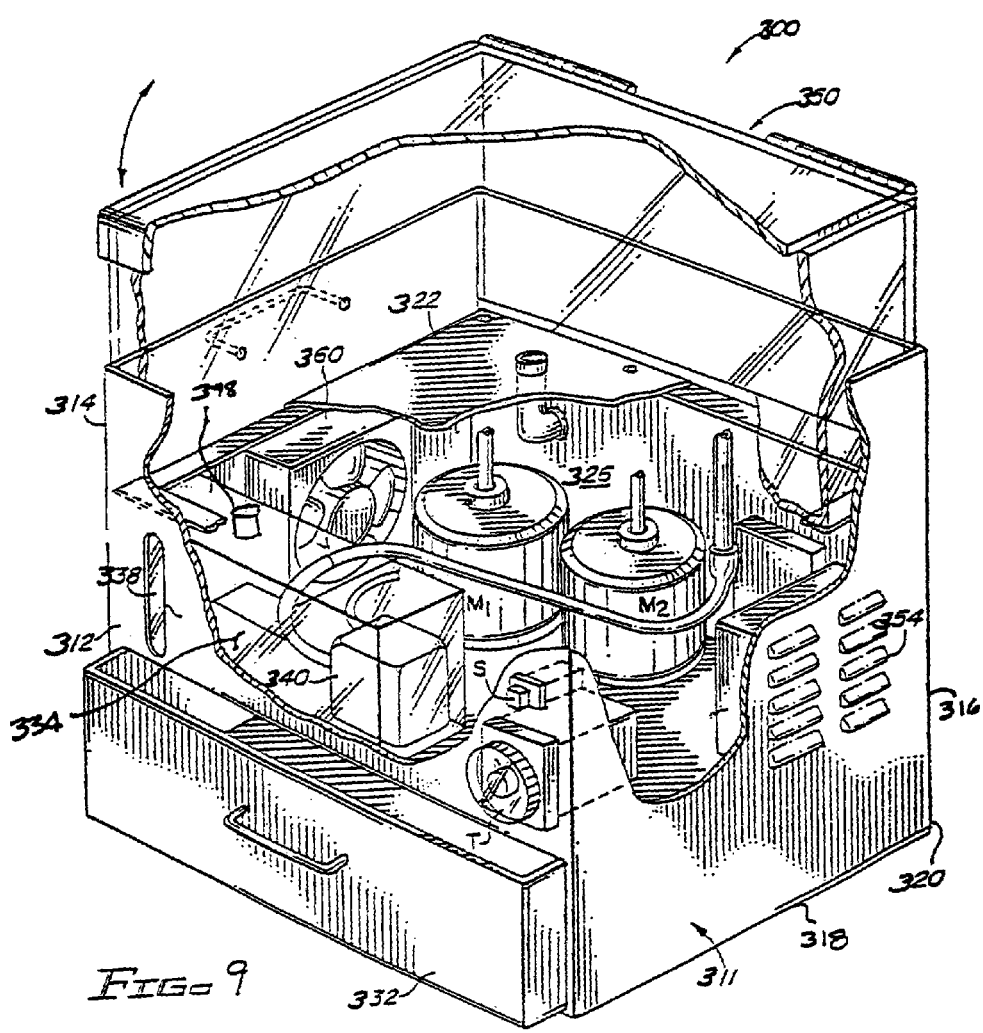
FIG. 9 is a perspective view of a modified version of the resurfacing apparatus in which both initial resurfacing and polishing can be accomplished in a single device.
Figure 10:
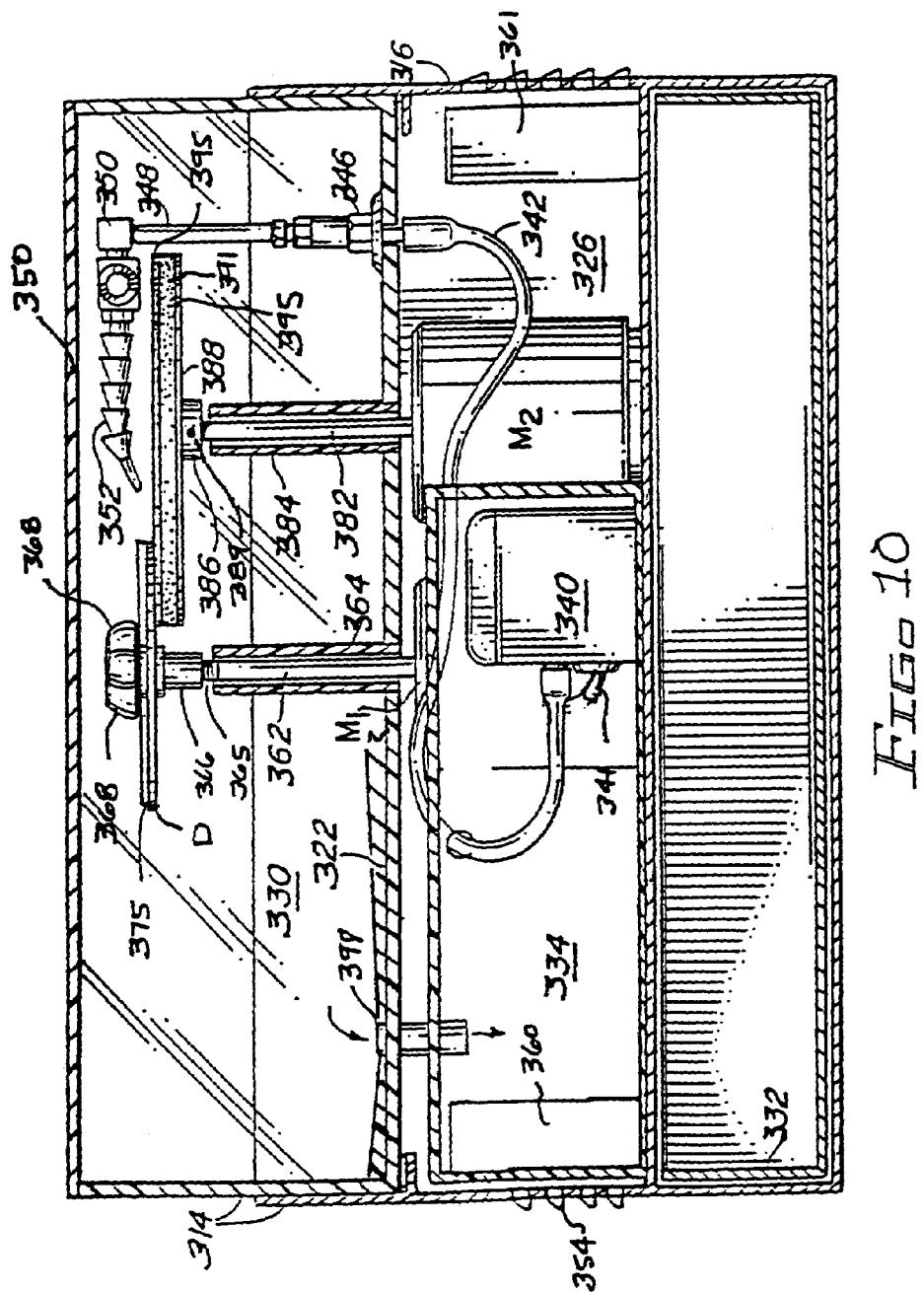
FIG. 10 is a cross-sectional view of the apparatus of FIG. 9.

Turning now to FIGS. 9 and 10, an alternate embodiment of the resurfacing apparatus of the present invention is shown and is generally designated by the numeral 300. Prior embodiments describe an apparatus and method for reconditioning compact discs in which the deeper blemishes are first removed and subsequently the plastic surface from which the deeper blemishes and scratches have been removed are polished and buffed on a polishing apparatus. Both the initial processing and the subsequent polishing are accomplished on similar devices and utilize similar methods which involve the use of abrasive pads of various grits.

In the embodiment of FIGS. 9 and 10, initial scratch or blemish removal and subsequent polishing can be accomplished in a single operation on a single machine. With this embodiment, it is not necessary to utilize abrasive pads of varying grits, rather a fluid polishing compound termed a "slurry" is utilized which will fully recondition the disc in a single operation.

Turning now to FIGS. 9 and 10, a resurfacing apparatus is generally as described above is shown having a cabinet 311 with a front wall 312, opposite sidewalls 314 and 316, a bottom 318 and rear wall 320. The cabinet is open at its upper end and has an intermediate planar floor 322. The floor 322 divides the cabinet into a lower component compartment 326 which houses the motors and other components and an upper resurfacing chamber 330. An optional drawer 332 may be slidably received within the lower portion of the cabinet 311 for storage of materials.

The lower compartment 326 houses a reservoir 334 which is shown as being a generally rectangular drawer positioned adjacent the front wall. The reservoir 334 is fabricated from a suitable material such as a durable, transparent plastic. A sight glass 338 is located in the reservoir wall so the level of fluid in the reservoir may be visually monitored.

A submersible pump 340 is positioned in or adjacent the reservoir 334 and has an outlet connected to a flexible tubing section 342 which terminates at a fitting 346 in the floor 322. A vertical supply tube 348 is secured to fitting 346 at its lower end. The upper end of the supply tube 348 is connected to an outlet or nozzle 352 across valve 350. The outlet 352 is positioned to direct a constant stream of fluid on the surface of material 395 on pad 388 as will be explained hereafter. The inlet 341 of pump 340 is connected to draw fluid from the reservoir 334. In use, the reservoir will be filled with a suitable fluid polishing compound. One suitable product is Amber-Cut ASL 2000 available from Innovative Organics of Anaheim, Calif. The product is a non-petroleum-based, aluminum oxide slurry compound. Other polishing slurries are commercially available and known to those in the art of polishing and lapping in fields such as semi-conductor processing and optical finishing.

In lieu of a submersible pump 340, a pump such as a peristaltic pump can be used and located either exterior of the cabinet or in compartment 330.

Opposite end walls 314 and 316 are provided with a series of vents or louvers 354. A first fan 360 is located adjacent end wall 314 and draws air from the exterior of the cabinet and discharges it into the lower component chamber. A second fan 361 is located adjacent the interior side of end wall 316 and draws air from within the component chamber and discharges it through the louvers 354. The fans operate to keep the components within the component compartment cool.

Polishing is accomplished by means of motors M1 and M2 which are preferably fractional horse power electric motors. The motor speeds may vary and may reach speeds as high as 4000 rpms although best results are obtained at rotational speeds of between 100 rpms and 1750 rpms. The motors may be either fixed or variable speed and operate in opposite directions at the same speed. The motors, fans and pump are in a circuit as shown and described with reference to FIG. 4 and are energized by a power switch and timer.

Motor M1 has an output shaft 362 which extends upwardly into the resurfacing chamber 330 and is housed within a fixed sleeve. The upper, distal end of shaft 362 is threaded at 365. A hub 366 is slidable along the shaft and may be positioned at any selected axial position along the shaft as has been described. A disc D to be processed will rest on collar of the hub 366 and is held by threaded knob 368. A bearing plate 375 is preferably interposed between the knob and the upper surface of the disc D to apply uniform pressure over the surface of the disc. When the resurfacing operation is carried out, the disc is positioned with the label area disposed upwardly and the plastic protective layer disposed downwardly. The blemishes are removed rom the protective layer which is also polished in the same operation.

Motor M2 has a vertically extending shaft 382 which is in spaced, parallel relationship with shaft 362. Shaft 382 also extends through a fixed sleeve 384, the upper end of which carries an arbor 388 which is mounted on a hub 386. The hub 386 is securable to shaft 382 by means of setscrew 389.

The upper surface of arbor 388 may be provided with areas of suitable fastener material such as one component of a loop-and-hook fastener as has been described with reference to FIG. 6. The arbor supports the resurfacing and polishing components. The one-step resurfacing operation utilizes a pad 391 of foam, natural or synthetic rubber or similar resilient material which is detachably secured to the upper surface of arbor 388 held in place by detachable fastening strips such as loop and hook fastener as seen in FIG. 6. The upper surface of the resilient pad carries a polishing pad 395 which, in contrast to previous embodiments, is non-abrasive but is a textured fabric material such as a fabric of natural or synthetic material. One such material is the fabric material designated Tricot®.

Other fabric materials such as felt, woven cotton, ribbed natural and synthetic fabric will also work. The material should be absorbent to retain the slurry and have some texture to its surface to assist in material removal.

The apparatus further includes a protective cover 350 which may be either removable or hinged to the body.

With the embodiments shown in FIGS. 9 and 10, a disc to be processed is mounted on the shaft of motor M1 with the label area disposed upwardly and the protective plastic layer disposed downwardly. The disc D is positioned on the collar of hub 366 and the hub positioned so the plastic layer will be in gently, but firm, flat-to-flat contact with the material 392 covering the top of the resilient foam pad 391.

The diameter of the arbor and the pad are selected to fully resurface the annular digital information band. The resurfacing is a flat-to-flat procedure which avoids rounding edges of the disc. The bearing plate 375 is positioned over the label area of the disc and the knob 368 is tightened in place. The resilient pad 391, which is detachably secured to the surface of the arbor 388, supports the polishing pad 395. The timer T is set for a desired time from one to several minutes, perhaps up to five minutes, or more, depending on the severity of the scratches and blemishes. The motors, pumps and fans are energized which causes motors M1 and M2 to rotate in opposite directions inwardly towards the polishing area as shown in FIG. 3. Resurfacing slurry fluid of the type described is delivered to the upper center of the surface of pad 395 to provide a wet resurfacing operation and to keep the disc cool. The fluid is delivered either continuously or in pulses at a selected rate for the period of time of the polishing operation. The counter rotation of the disc and polish will transfer the slurry to the disc and pad interface. The operator can visually determine when the blemishes and scratches have been removed and the surface polished to a substantially like-new condition, generally from about one to five minutes depending on the severity of the damage. The removed material and slurry that is discharged during the operation will be expelled from the disc and pad interface and will collect in the bottom of the upper compartment and will be drained into via the drain 398 reservoir so that the slurry may be continuously recycled and used. Floor 322 may be sloped to direct fluid to the drain 398. The removed plastic material does not interfere with the polishing operation. In this embodiment, initial scratch and blemish removal and subsequent polishing occur in a single, continuous operation. When the surface of the disc has been restored, the disc is removed, cleaned and ready for use.

While the principles of the invention have been made clear in the illustrative embodiments set forth above, it will be obvious to those skilled in the art to make various modifications to the structure, arrangement, proportion, elements, materials and components used in the practice of the invention. To the extent that these various modifications do not depart from the spirit and scope of the appended claims, they are intended to be encompassed therein.

I claim:

1. A one-step method of resurfacing an information bearing disc of the type having a protective surface overlying an information layer in which the protective surface has blemishes, said information layer extending from the peripheral edge of the disc to a center band, said method comprising;
    (a) positioning the disc on a first generally vertical shaft with the protective layer disposed downwardly;
    (b) positioning a resilient pad on a second shaft in parallel relationship with said first shaft with said resilient pad supporting an upwardly facing resurfacing material, said pad and resurfacing material being selected so the information layer overlaps the pad and resurfacing material extending from the periphery only to approximately the center band of the disc;
    (c) rotating said first and second shafts in opposite rotational directions at approximately the same speed;
    (d) providing a sump containing a polishing slurry;
    (e) applying the polishing slurry from the sump to the upwardly facing resurfacing material and collecting the fluid and removed material in the sump for recycling; and
    (f) continuing said rotation and application of fluid until at least a substantial portion of any blemish or scratch in the protective layer of the disc is removed.

2. The method of claim 1 wherein the polishing fluid is non-petroleum based slurry containing a polishing compound in about the 1 to 10 micron range.

3. The method of claim 1 wherein one of said disc and resilient pad is axially adjusted on its associated shaft to obtain contact between the pad and the disc.

4. The method of claim 1 further including the step of applying a bearing force to the upwardly facing surface of the disc to maintain the disc flat and to prevent slipping while resurfacing.

5. The method of claim 1 wherein said resurfacing material is a fabric material.

6. The method of claim 5 wherein the fabric material is selected from the group consisting of cotton, felt and Tricot.

7. An apparatus for resurfacing digital information bearing discs of the type having a central opening and having a protective surface on one side overlying an annular information layer which extends from the edge of the disc toward the central opening and an opposite label surface, said apparatus comprising:

(a) a cabinet having a processing compartment;

(b) first and second motors located in said cabinet, said first motor having a generally vertically extending first shaft and said second motor having a generally vertically extending second shaft, said first and second shafts being disposed in parallel spaced-apart relationship and being rotatable in opposite directions at approximately the same rotational speed;

(c) said first shaft having mounting means in said processing compartment thereon for mounting a disc in a generally horizontal position with the protective surface to be resurfaced disposed downwardly and the opposite label surface upwardly disposed;

(d) an arbor on said second shaft supporting a resilient pad in overlapping relationship with the protective surface of said disc, said resilient pad having a surface which receives a resurfacing material;

(e) mounting means being adjustable to maintain substantially planar contact between the disc and resurfacing material;

(f) a fluid reservoir for containing a polishing fluid;

(g) fluid discharge means positioned communicating with said reservoir for delivering fluid from said reservoir to the surface of the resurfacing material; and (h) return means for returning fluid and material discharged into said processing compartment during resurfacing to said fluid reservoir for reuse.

8. The apparatus of claim 7 wherein said resurfacing material is a fabric.

* * * * *